United States Patent [19]

Rodgers, III

[11] 4,361,784
[45] Nov. 30, 1982

[54] SYSTEM FOR COUPLING THE FOCUS CURRENT TO THE FOCUS VOLTAGE OF A CAMERA TUBE

[75] Inventor: Robert L. Rodgers, III, Lancaster, Pa.

[73] Assignee: RCA Corporation, New York, N.Y.

[21] Appl. No.: 96,824

[22] Filed: Nov. 23, 1979

[51] Int. Cl.³ .............................................. H01J 29/58
[52] U.S. Cl. .................................. 315/382; 315/31 R
[58] Field of Search ............... 315/382, 31 R, 31 TV; 358/218

[56] References Cited

U.S. PATENT DOCUMENTS 3,355,621 11/1967 Cosgrove .

4,198,592 4/1980 Miyoshi et al. .................... 315/382

*Primary Examiner*—Theodore M. Blum
*Attorney, Agent, or Firm*—Eugene M. Whitacre; Paul J. Rasmussen; William H. Meise

[57] ABSTRACT

A focussing system for a camera tube in which the nominal magnitude of the focus tube voltage and focus coil current are predetermined and in which incremental changes in the focus voltage result in square-root proportional incremental changes in the focus current. Alternatively, incremental changes in focus current result in changes in the focus voltage which are proportional to the square of the current changes by which they are caused.

3 Claims, 4 Drawing Figures

SYSTEM FOR COUPLING THE FOCUS CURRENT TO THE FOCUS VOLTAGE OF A CAMERA TUBE

BACKGROUND OF THE INVENTION

This invention relates to focussing arrangements for camera tubes in which the focus current and focus voltage track in a square or square-root relationship.

Camera tubes such as vidicons require focussing of the electron beam. This focussing is normally accomplished by an electrostatic focus electrode in the form of a cylinder or tube through which the electron beam passes on its way from the electron gun to the photosensitive surface. A high positive direct potential is applied to the focus tube. In conjunction with the electrostatic focus, a solenoidal focus coil through which a focus current passes is wound about the exterior of the camera tube to aid in focussing.

The magnitude of the focus current depends upon the number of turns in the coil, the amount of focussing desired and the like.

In the past, the focus voltage and focus current applied to the focus tube and focus coil, respectively, have been manually adjusted to particular values providing optimum focus. For less critical applications, such manual adjustments are satisfactory. However, in the presence of component aging, power-supply voltage variations, environmental changes such as temperature changes, and the like, defocussing of the electron beam may occur.

Cameras intended for critical applications, such as studio cameras, use feedback regulators to maintain the focus voltage and focus current to within very close tolerances, such as ½%, of the predetermined optimum value.

U.S. Pat. No. 3,355,621 issued Nov. 28, 1967 to W. J. Cosgrove describes an arrangement in which the need for close regulation of the focus voltage and focus current is reduced. In the Cosgrove arrangement, the focus voltage is slaved to or controlled by the focus current in such a manner that incremental changes away from the preset focus current create proportional changes in the focus current. A "proportional change" for this purpose means that the percentage change in the magnitude of the focus voltage equals the percentage change in the focus current to which the focus voltage is slaved.

Modern surveillance and industrial cameras must meet high technical standards in a highly cost-competitive market. It is desirable to provide improved focus performance without the cost of high-accuracy regulation of the focus voltage and current.

SUMMARY OF THE INVENTION

A focussing system for a camera tube includes a source of voltage coupled to the focus tube of the camera tube. A current source is coupled to the focus coil. A control arrangement is coupled to the voltage source and to the current source for slaving them together in such a manner that incremental offsets of one of the sources away from a predetermined level results in a corresponding offset of the other source away from its predetermined nominal value by an amount expressed as a power including the integer 2.

DESCRIPTION OF THE INVENTION

Figure 1:
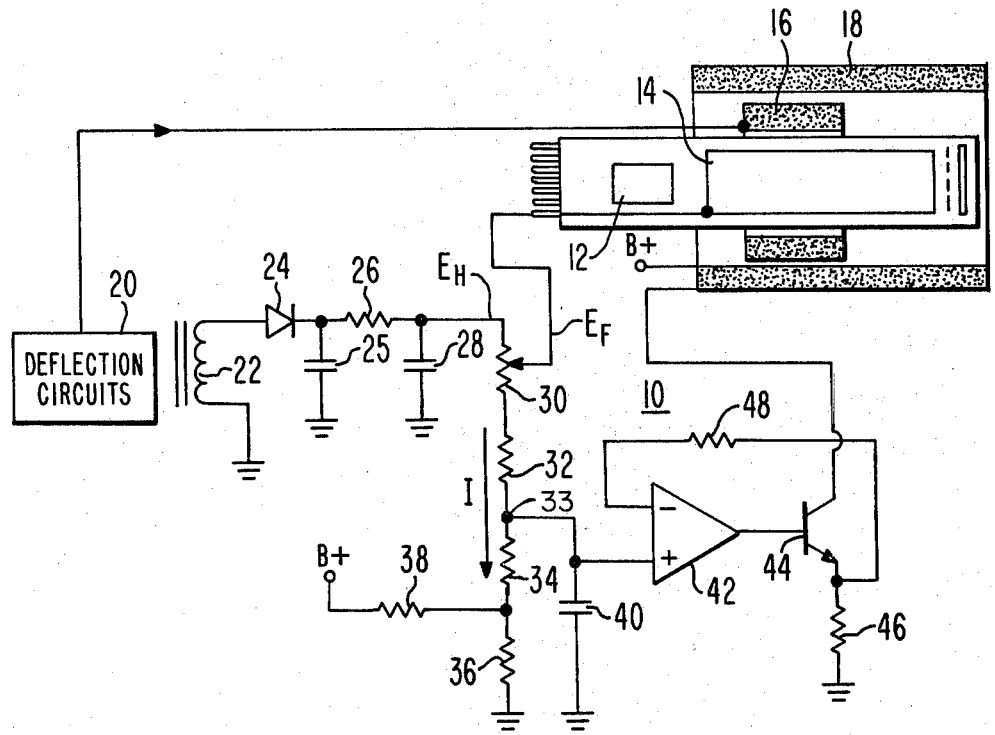
FIG. 1 is a schematic diagram of an arrangement according to the invention.

In FIG. 1, a camera tube designated generally as 10 includes an electron gun 12 and an electrostatic beam focussing electrode 14 in the shape of an elongated right circular cylinder. A deflection winding 16 is arranged around the exterior of tube 10 to deflect the electron beam. An electromagnetic focussing coil 18 in the form of a solenoid also surrounds the tube. Deflection circuits illustrated as a block 20 are coupled to deflection winding 16 and to the secondary winding 22 of a transformer for producing high voltage pulses for generating the focus voltage. The high-voltage pulses are coupled to a rectifier illustrated as a diode 24 for rectification. The rectified pulses pass through a filter including a resistor 26 and capacitors 25 and 28 for producing the direct voltage from which the focus voltage is derived. A voltage divider including serially coupled resistors 30, 32, 34 and 36 is coupled across capacitor 28. Resistor 30 is a potentiometer having a slider by which the desired nominal focus voltage is set. The slider of potentiometer 30 is coupled to focus tube 14. A resistor 38 couples the junction of resistors 34 and 36 to a source B+ of reference potential. The noninverting input of an amplifier 42 is coupled to the junction point 33 of resistors 32 and 34, and its output is coupled to the base of a transistor 44. The emitter of transistor 44 is coupled to ground by a resistor 46 and to the inverting input of amplifier 42 by a resistor 48. The collector of transistor 44 is coupled to one end of focus coil 18, and the other end is coupled to B+. The arrangement of amplifier 42 and 44 is a voltage follower which buffers the voltage divider from the base of the transistor and which translates the voltage at point 33 to the emitter of transistor 44.

In operation, the current flow through resistor 46 and through focus coil 18 depends upon the voltage across resistor 46, which in turn is made to equal the voltage at the junction of resistors 32 and 34, as described. Thus, the focus current is slaved to the focus voltage. However, unlike the arrangement of the Cosgrove patent, the changes in the focus current are not proportional to the changes in the focus voltage. Rather, the focus current depends upon the square-root of the focus voltage for improved focus tracking.

Figure 2:
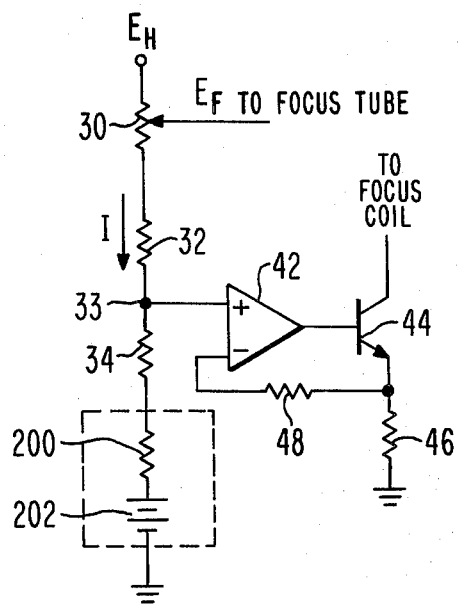
FIG. 2 is an equivalent circuit of a portion of FIG. 1.

This is accomplished by the arrangement including resistors 34, 36 and 38. Resistors 36 and 38 coupled to B+ form a voltage divider having an equivalent Thevenized voltage and resistance. These are further explained by reference to FIG. 2. FIG. 2 illustrates in simplified form the equivalent circuit of the voltage divider including resistor 38 and B+. In FIG. 2, potentiometer 30, and resistors 32 and 34 form with a resistor 200 and series-connected battery 202 a voltage divider across capacitor 28 which divides high voltage $E_H$. A current I substantially proportional to the magnitude of the high voltage $E_H$ across capacitor 28 and to the focus voltage $E_F$ flows through resistors 30, 32, 34, 200 and battery 202. Resistors 30 and 32 are selected to have a high resistance so that current I entering resistor 34 appears to be coming from a current source proportional to $E_H$ or $E_F$. Resistor 200 represents the Thevenized impedance of the voltage divider including resistors 36 and 38 (i.e., the resistance of resistor 200 is equal to the resistance of resistors 36 and 38 in parallel). Battery 202 represents the open-circuit Thevenized voltage equivalent of voltage divider 36, 38. Resistor 34 is selected in conjunction with resistor 200 so that the voltage across the series combination of resistors 34 and 200 as a result of the flow of current I therethrough equals the voltage of source 202.

An incremental or percentage change in voltage $E_H$ produces between point 33 and ground a smaller percentage change. The voltage at point 33 is the sum of a constant voltage and voltage which depends upon the current through resistors 34 and 200, which in turn depends upon high voltage $E_H$. Thus, a given percentage change in the value of high voltage $E_H$ results in exactly half that percentage change in the voltage at point 33. The ratio 1/2 is selected as being a first-order approximation to a square-root function. To a very close approximation, therefore, the voltage at point 33 is proportional to the square-root of high voltage $E_H$. Since the voltage across resistor 46 equals the voltage at point 33, the focus current change is proportional to the square-root of the changes in the focus voltage. This provides improved tracking of the focus coil current and eliminates the need for high-precision regulation of the focus voltage and focus current.

Figure 3:
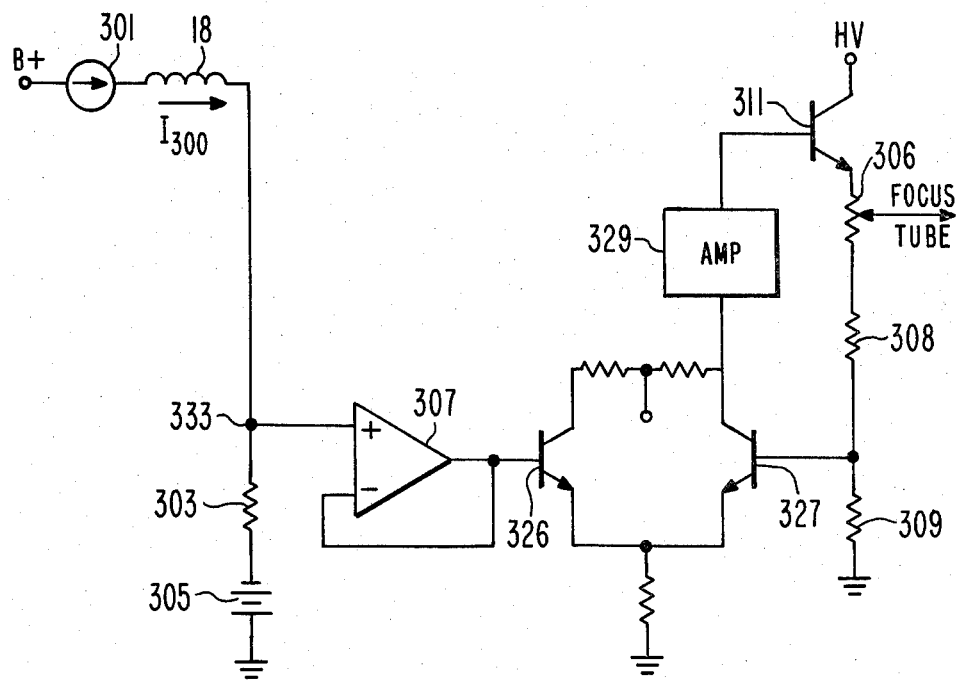
FIG. 3 illustrates a second embodiment of the invention.

FIG. 3 illustrates an embodiment of the invention in which the focus voltage is made to track the square of the focus current, which provides equivalent performance. In FIG. 3, a source B+ to the left is coupled to a current source 301 and to a focus coil 18. The end of focus coil 18 remote from source 301 is coupled to ground by a resistor 303 and a battery 305. Battery 305 has its positive terminal grounded and its negative terminal coupled to resistor 303.

An amplifier 307 arranged as a voltage follower has its input coupled to circuit point 333 and its output connected to the base of a transistor 326. Transistor 326 is coupled as a differential amplifier with transistor 327 and is arranged with a source of high voltage, a transistor 311, an amplifier 329 and a voltage divider 306, 308 and 309 to produce a focus voltage at a slider on resistor 306 in a manner corresponding to that of the arrangement of Cosgrove. That is, the focus voltage taken from resistor 306 is proportional to the voltage at the base of transistor 326.

The focus current I300 flowing through focus coil 18 flows to ground through resistor 303 and through battery 305. The resistance of resistor 303 is selected so that the flow therethrough of the nominal value of current I300 results in a voltage thereacross equal to exactly twice the voltage of battery 305. This has the effect of making changes in the voltage between point 333 and ground exactly twice as large, proportionally, as the changes in I300 by which they are generated. Thus, the voltage at point 333 by which the focus voltage is controlled is proportional to the square of the corresponding focus current changes.

Figure 4:
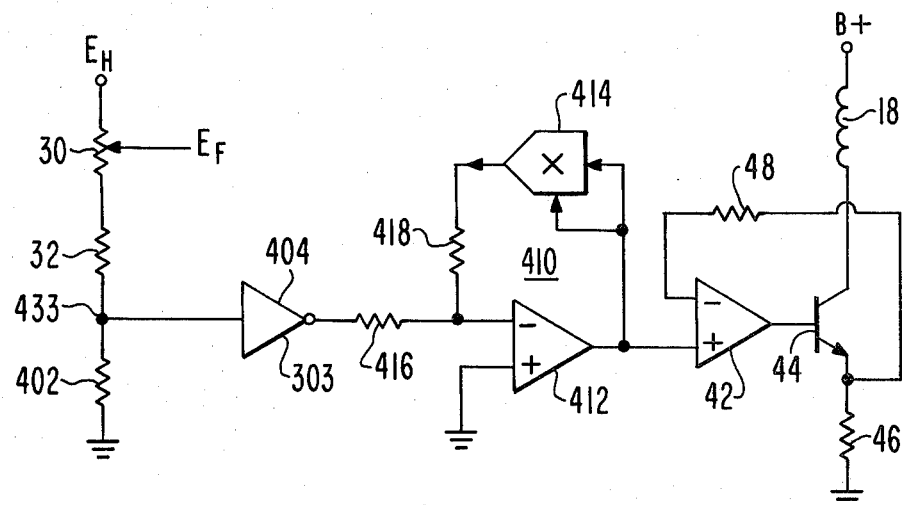
FIG. 4 illustrates a third embodiment of the invention.

In FIG. 4, elements corresponding to those of FIG. 1 have the same reference numbers. In FIG. 4, a voltage divider including resistors 30, 32 and 402 is coupled between source $E_H$ and ground and produces at junction point 433 a positive voltage relative to ground which is proportional to voltage $E_H$ and the focus voltage. An inverting amplifier 404 coupled to point 303 produces a voltage which is negative relative to ground. This negative voltage is coupled to a square-root circuit designated generally as 410 by way of an input resistor 416. The other end of resistor 416 is coupled to the inverting input of an amplifier 412. A degenerative feedback path around amplifier 412 includes a multiplier illustrated as 414, both inputs of which are coupled together to form a squaring circuit. The output of multiplier 414 is coupled by a resistor 418 to the inverting input of amplifier 312 to complete the feedback path. An output representing the square-root of the voltage at point 433 is produced at the output terminal of amplifier 412 and is coupled to the noninverting input of amplifier 42. This arrangement causes the focus current through coil 18 to track the square-root of the focus voltage. It will be apparent that a squaring circuit can be used in a generally similar manner to slave the focus voltage to the focus current.

In a particular embodiment of the invention as illustrated in FIG. 1, the following component values were found to give satisfactory operation:

| B+ 8.5 volts RESISTORS | $E_H = 287$ volts |
|---|---|
| 26 | 100k |
| 30 | 1M |
| 32 | 2M |
| 34 | 6200 |
| 36 | 620 |
| 38 | 7500 |
| 46 | 10 |

The corresponding value of resistor 200 in this embodiment is 572 ohms, and the value of battery 202 is 0.65 volts. The current flow through resistor 32 is approximately 96 microamperes, and the voltage drop across resistors 34 and 200 equals approximately 0.65 volts. If voltage $E_H$ rises by 20% to 344 volts, the current in resistor 32 will increase to 115 microamperes, causing a voltage drop across resistors 34 and 200 of 0.781 volts, thereby creating a total voltage at point 33 of 1.43 volts which is a 10% increase over the nominal value of 1.3 volts. Thus, a 20% change in $E_H$ results in a 10% change in the focus current, as required by the square-root relationship.

I claim:

1. An arrangement for slaving the focus current of a camera tube to the focus voltage, comprising:

a source of focus voltage having a predetermined nominal value;

voltage-to-current conversion means coupled to said source of focus voltage for producing a focus-voltage-indicative current proportional to said focus voltage;

a source of reference voltage;

resistance means serially coupled with said source of reference voltage and with said voltage-to-current conversion means for forming a series combination in which all of said focus-voltage-indicative current flows through said source of reference voltage, said resistance means having a magnitude such that the flow of said focus-voltage-indicative current therethrough when said focus voltage is at its predetermined nominal value causes a voltage across said resistance means equal to the voltage of said source of reference voltage; and current control means coupled to said series combination and to the focus coil for creating a current through said focus coil proportional to the voltage across said series combination.

2. A focusing arrangement for a camera tube, comprising:

a first source of current proportional to the focus voltage;

a second source of focus current resistance means;

a source of reference voltage coupled with said resistance means and with said second source for producing a control signal, the incremental changes of which differ by a factor of two from the changes in said focus current by which they are produced; and focus voltage control and generating means coupled to said second source for causing said focus voltage to vary incrementally in proportion relating to said control signal whereby said focus voltage is controlled in proportion to the square of changes in said focus current.

3. A focusing arrangement for a camera tube, comprising:

a first source of current proportional to the focus voltage;

a second source of focus current;

inverting amplifying means coupled to one of said first and second sources for producing an amplifier output signal;

nonlinear feedback means coupled to said inverting amplifier for causing said amplifier output signal to follow the current of the one of said sources to which the input of said inverting amplifying means is coupled in a relationship expressed as a power including the integer 2; and control means coupled to the output of said inverting amplifying means and to the other of said first and second sources for controlling said other sources in proportion to said amplifier output signal.

* * * * *